Nov. 10, 1959    S. R. PEOPLES    2,912,634
ELECTRICAL CONTROL CIRCUITS
Filed July 22, 1957    4 Sheets-Sheet 1

INVENTOR.
SAMUEL R. PEOPLES
BY
ATTORNEY

Nov. 10, 1959  S. R. PEOPLES  2,912,634
ELECTRICAL CONTROL CIRCUITS
Filed July 22, 1957  4 Sheets-Sheet 3

INVENTOR.
SAMUEL R. PEOPLES
BY
ATTORNEY

Nov. 10, 1959   S. R. PEOPLES   2,912,634
ELECTRICAL CONTROL CIRCUITS
Filed July 22, 1957   4 Sheets-Sheet 4
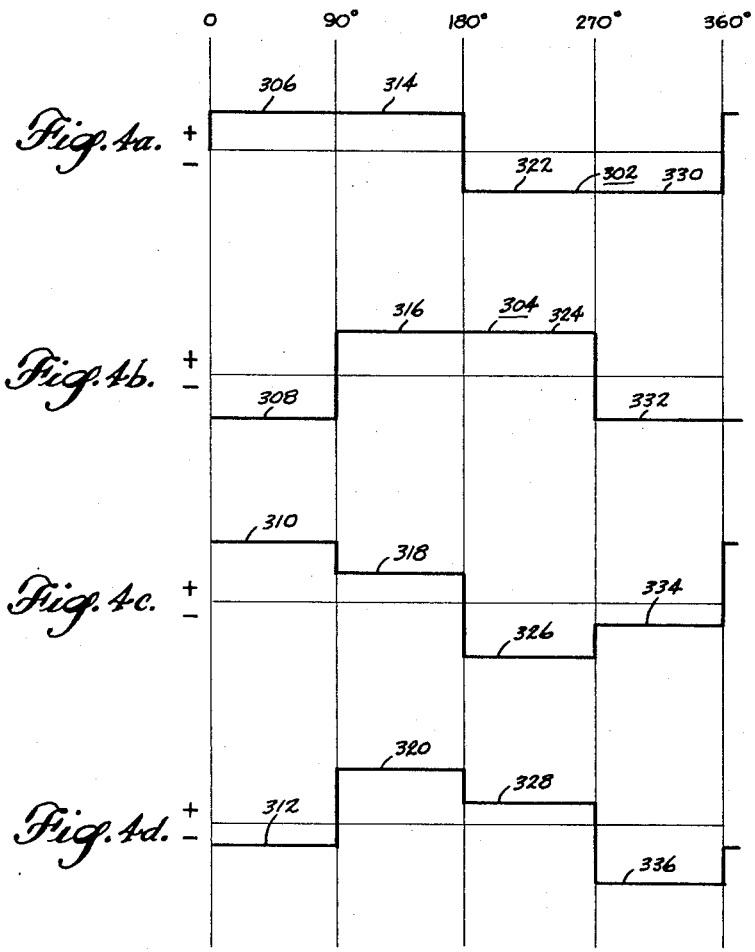
INVENTOR.
SAMUEL R. PEOPLES
BY
ATTORNEY

United States Patent Office 2,912,634
Patented Nov. 10, 1959

2,912,634

ELECTRICAL CONTROL CIRCUITS

Samuel R. Peoples, Seattle, Wash., assignor to Boeing Airplane Company, Seattle, Wash., a corporation of Delaware Application July 22, 1957, Serial No. 673,196

15 Claims. (Cl. 321—5)

This invention relates to electrical control circuits and more particularly to static type inverter circuits employing semi-conductors and magnetic circuitry.

Many prior art inverters employ transistors in combination with magnetic circuitry. However, in such prior art inverters the voltage applied between the emitter and collector of the transistors is approximately twice the magnitude of the direct-current supply voltage. Manufacturers of transistors specify a maximum emitter to collector voltage that can be applied to the transistor before damage is done thereto. Thus, in these prior art inverters there is a limitation on the amount of power output that can be obtained from the inverter for a given size of transistor owing to the limitation on the magnitude of emitter to collector voltage that can be applied safely to the transistor.

Some of the prior art inverters are sensitive to changes in the magnitude of the load supplied by the inverter. In particular, the frequency of these prior art inverters varies with changes in the magnitude of the load. In one such prior art inverter this occurs since the incorporated transistors are the only components that function to limit the current supplied to the primary windings of the magnetic circuit, the load being connected to the secondary winding of the magnetic circuit. Thus, any change in the magnitude of the load changes the amount that the magnetic core of the magnetic circuit is driven into saturation. Therefore, the frequency of oscillation of the inverter varies with changes in the magnitude of the load. Of course, in such a prior art inverter the more rectangular is the hysteresis loop of the magnetic core material the less will be the change in frequency for a given change in magnitude of load. However, magnetic cores constructed of a material having a substantially rectangular hysteresis loop are far more costly than cores made from a material which does not exhibit a truly rectangular hysteresis loop.

Several of the prior art inverters employing transistors and magnetic circuitry produce an alternating output voltage which varies in accordance with the magnitude of the direct-current supply voltage. Therefore, if the frequency of the output voltage is to be substantially constant some means must be provided to maintain the magnitude of the direct-current supply voltage constant. This increases the overall size of the inverter as well as its initial cost of manufacture.

Therefore, an object of this invention is to provide a new and improved multi-phase inverter.

Another object of this invention is to provide for minimizing the peak voltage applied to the transistors of an inverter when the transistors are biased to cut off, to thus increase the power output from the inverter for a given size of transistor.

A further object of this invention is to provide in an inverter for limiting the current input to a plurality of saturating transformers which control the switching operation of the inverter so that each of the saturating transformers is driven a predetermined amount into saturation to thus maintain the frequency of oscillation of the inverter independent of changes in the magnitude of the load.

Still another object of this invention is to provide for minimizing changes in the frequency of oscillation of an inverter due to changes in the magnitude of the source of direct-current voltage, by so interconnecting switching transistors with the output of a plurality of saturating transformers that owing to the current-voltage characteristics of the transistors the transistors effect only small changes in the magnitude of the input voltage to the saturating transformers for large changes in the magnitude of the source of direct-current voltage.

Another object of this invention is to provide for readily changing the frequency of oscillation of a multi-phase inverter.

A further object of this invention is to provide switching means for controlling the delivery of power from a direct-current source to a load while permitting the delivery of power from the load to the direct-current source at any time.

Other objects of this invention will become apparent from the following description when taken in conjunction with the accompanying drawings in which:

Figs. 4a through 4d are graphs illustrating the voltages that appear at different points on the two-phase inverter of Fig. 3.

Figure 1:
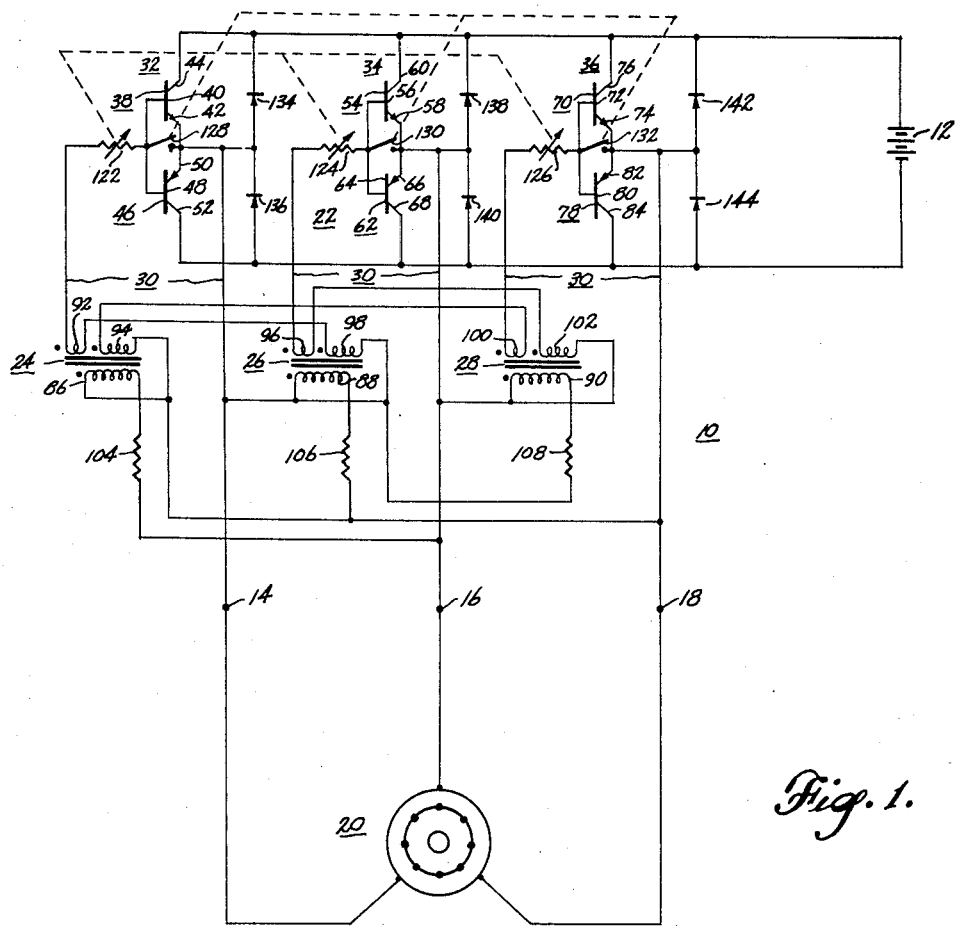
Fig. 1 is a schematic diagram of apparatus and circuits illustrating a three-phase inverter embodying teachings of this invention.

Referring to Fig. 1 there is illustrated a three-phase inverter 10, embodying teaching of this invention, which is connected to be responsive to a source of direct-current voltage 12 to effect at a multi-phase output, including output terminals 14, 16 and 18, a three-phase alternating output voltage. For the purpose of illustrating a typical load that might be connected to the output of the inverter 10, a three-phase squirrel cage induction motor 20 is shown connected to the output terminals 14, 16 and 18.

In general, the three-phase inverter 10 comprises switching means 22 for connecting the source of direct-current voltage 12 to each phase of the three-point output, including the output terminals 14, 16 and 18; means, including saturating transformers 24, 26 and 28, for obtaining two voltage measures of the voltage across each phase of the three-phase output and for combining one of the two voltage measures of each phase of the three-phase output with one of the voltage measures of a preceding phase of the three-phase output and for combining the other of the two voltage measures of each phase of the three-phase output with one of the voltage measures of a succeeding phase of the three-phase output to obtain a plurality of resultant control voltages; and circuit means 30 for applying the resultant control voltages to the switching means 22 to control the switching operation of the switching means 22 so as to connect the source of direct-current voltage 12 to the three-phase output in a predetermined manner.

Referring more particularly to the switching means 22, the switching means 22 includes three pairs of semi-conductors or transistors 32, 34 and 36. In operation, the pair of transistors 32 functions to connect the output terminal 14 to either the positive or the negative side of the source of direct-current voltage 12. Specifically, an n-p-n junction type transistor 38, including a base electrode 40, an emitter electrode 42, and a collector electrode 44, is so disposed and interconnected with the other components of the inverter 10 as to connect the positive side of the source of direct-current voltage 12 to the output terminal 14 when the transistor 38 is in the conducting state. On the other hand, a p-n-p junction type transistor 46, including a base electrode 48, an emitter electrode 50, and a collector electrode 52, is provided for connecting the negative side of the source of direct-current voltage 12 to the output terminal 14 when the transistor 46 is in the conducting state. As will be explained hereinafter the conducting or non-conducting state of the transistors 38 and 46 is dependent upon the polarity of the resultant control voltage applied to the pair of transistors 32.

In like manner, the pair of transistors 34 includes an n-p-n junction type transistor 54, including a base electrode 56, an emitter electrode 58, and a collector electrode 60, for connecting the positive side of the source of direct-current voltage 12 to the output terminal 16 when the transistor 54 is in a conducting state. Corresponding to transistor 46, a transistor 62 of the p-n-p junction type, and including a base electrode 64, an emitter electrode 66, and a collector electrode 68, is provided for connecting the output terminal 16 to the negative side of the source of direct-current voltage 12 when the transistor 62 is in the conducting state.

In operation, the output terminal 18 is connected to the positive side of the source of direct-current voltage 12 by means of an n-p-n junction type transistor 70, having a base electrode 72, an emitter electrode 74, and a collector electrode 76. On the other hand, the negative side of the source of direct-current voltage 12 is connected to the output terminal 18 by means of a p-n-p junction type transistor 78, having a base electrode 80, an emitter electrode 82, and a collector electrode 84.

The saturating transformers 24, 26 and 28 are so constructed and so interconnected between the switching means 22 and the output terminals 14, 16 and 18 as to control the switching operation of the switching means 22 in such a manner as to effect the three-phase alternating voltage across the output terminals 14, 16 and 18. In this instance, the saturating transformers 24, 26 and 28 comprise primary windings 86, 88 and 90, respectively, and secondary windings 92 and 94, 96 and 98, and 100 and 102, respectively. As hereinbefore mentioned the means, including the saturating transformers 24, 26 and 28, is connected to be responsive to each phase of the three-phase output voltage appearing across the output terminals 14, 16 and 18. In particular, the primary winding 86, of the saturating transformer 24, is connected between the output terminals 16 and 18. On the other hand, the primary winding 88, of the saturating transformer 26, is connected between the output terminals 14 and 18. The primary winding 90, of the saturating transformer 28, is connected to the remaining phase appearing between the output terminals 14 and 16.

In order to limit the magnitude of the current flow through the primary windings 86, 88 and 90 to a predetermined or fixed value and thus render the frequency of operation of the three-phase inverter 10 substantially independent of changes in the magnitude of the load 20, current-limiting resistors 104, 106 and 108 are connected in series circuit relationship with the primary windings 86, 88 and 90, respectively.

The frequency of oscillation of the three-phase inverter 10 is dependent upon the time required to saturate the saturating transformers 24, 26 and 28. This time to saturate is determined by the construction of the saturating transformers 24, 26 and 28 and by the magnitude of the voltage applied to each of the primary windings 86, 88 and 90. As can be seen from Fig. 1, a change in the magnitude of the source 12 effects a change in the magnitude of the voltage applied to the primary windings 86, 88 and 90. However, the voltage across the primary windings 86, 88 and 90 does not change proportionately as much as the change in the magnitude of the voltage of the source 12. The reason for this is that the voltages appearing across the primary windings 86, 88 and 90 are dependent upon the base-emitter voltages of the pairs of transistors 32, 34 and 36. A change in the magnitude of the source of direct-current voltage 12 changes the magnitude of the base-emitter currents supplied to the transistors of the pairs of transistors 32, 34 and 36 but owing to the voltage-current characteristic of these transistors the base-emitter voltages of the transistors do not change as rapidly as do the base-emitter currents and therefore the voltages reflected back to the primary windings 86, 88 and 90 likewise do not change proportionately as much for a given change in the magnitude of the voltage of the source 12.

As can be seen from Fig. 1, the secondary windings 94, 98 and 102 have a greater number of turns than their associated secondary windings 92, 96 and 100, respectively. In practice, if a resistive load (not shown) is connected to the output terminals 14, 16 and 18 then the secondary windings 94, 98 and 102 should have twice the number of turns as their associated secondary windings 92, 96 and 100, respectively. However, if an inductive load, such as the load 20, is connected to the output terminals 14, 16 and 18, then the secondary windings 94, 98 and 102 should have more than twice the number of turns as compared to their associated secondary windings 92, 96 and 100, respectively. The winding ratio between the secondary windings 94, 98 and 102 and their associated secondary windings 92, 96 and 100, respectively, should be less than two to one when a capacitative load (not shown) is connected to the output terminals 14, 16 and 18.

In operation, a measure of the voltage appearing between the output terminals 16 and 18 appears across both the secondary windings 92 and 94 when the saturating transformer 24 is in a non-saturated state. On the other hand, a measure of the alternating voltage appearing between the output terminals 14 and 18 appears across both the secondary windings 96 and 98 when the saturating transformer 26 is in a non-saturated state. When the saturating transformer 28 is in a non-saturated state a measure of the alternating voltage between the output terminals 14 and 16 appears across both the secondary windings 100 and 102.

In order to combine a measure of the voltage appearing between the output terminals 16 and 18 with a measure of the alternating voltage appearing between the output terminals 14 and 18, the secondary winding 92, of the saturating transformer 24, is connected in series circuit relationship with the secondary winding 98, of the saturating transformer 26. The resultant control voltage appearing across the secondary windings 92 and 98 is applied to the pair of transistors 32 by connecting one end of the series circuit, including the secondary windings 92 and 98 to the junction point of the base electrodes 40 and 48 through a variable resistor 122 and by connecting the other end of the series circuit to the junction point of the emitter electrodes 42 and 50. For descriptive purposes we will call the voltage appearing across the secondary winding 98 of the saturating transformer 26, a holding voltage and the voltage appearing across the secondary winding 92, of the saturating transformer 24, a switching voltage since, in operation, the voltage appearing across the secondary winding 98 holds the pair of transistors 32 in a particular state and the voltage across the secondary winding 92 effects a switching operation of the pair of transistors 32, as will be explained more fully hereinafter.

The secondary winding 96, of the saturating transformer 26, is connected in series circuit relationship with the secondary winding 102, of the saturating transformer 28, in order to combine a measure of the alternating voltage appearing between the output terminals 14 and 18 with a measure of the alternating voltage appearing between the output terminals 14 and 16. The resultant control voltage appearing across the secondary windings 96 and 102 is applied to the pair of transistors 34 by connecting one end of the series circuit, including the secondary windings 96 and 102, to the junction point of the base electrodes 56 and 64 through a variable resistor 124 and by connecting the other end of the series circuit to the junction point of the emitter electrodes 58 and 66. In this case the holding voltage appears across the secondary winding 102, of the saturating transformer 28, and the switching voltage appears across the secondary winding 96, of the saturating transformer 26.

A measure of the alternating voltage appearing between the output terminals 14 and 16 is combined with a measure of the alternating voltage appearing between the output terminals 16 and 18 by connecting the secondary winding 94, of the saturating transformer 24, in series circuit relationship with the secondary winding 100, of the saturating transformer 28. By connecting one end of the series circuit, including the secondary windings 94 and 100, to the junction point of the base electrodes 72 and 80 through a variable resistor 126 and by connecting the other end of the series circuit to the junction point of the emitter electrodes 74 and 82, the resultant control voltage appearing across the secondary windings 94 and 100 is applied to the pair of transistors 36. In this case the holding voltage appears across the secondary winding 94, of the saturating transformer 24, and the switching voltage appears across the secondary winding 100, of the saturating transformer 28.

As illustrated, the variable resistors 122, 124 and 126 are mechanically ganged together. By simultaneously varying the resistance values of the resistors 122, 124 and 126, the frequency of oscillation of the three-phase inverter 10 can be changed. For instance, if the resistance value of the variable resistors 122, 124 and 126, as connected in the circuit, is increased the magnitude of the voltage across the primary windings 86, 88 and 90 is increased thus decreasing the saturation time of the saturating transformers 24, 26 and 28, to thereby increase the frequency of oscillation of the three-phase inverter 10. On the other hand, if the resistance value of the variable resistors 122, 124 and 126, as connected in the circuit, is decreased the frequency of oscillation of the three-phase inverter 10 is decreased. Further, by individually adjusting the variable resistors 122, 124 and 126 one can compensate for irregularities in the saturating transformers 24, 26 and 28 and thus obtain a proper phasing of 120 degrees between each phase of the three-phase output.

In order to obtain an on-off operation of the three-phase inverter 10, a plurality of switches 128, 130 and 132 are so interconnected with the remaining components of the inverter 10 as to effect a shorting out of the resultant control voltage applied to the pairs of transistors 32, 34 and 36, respectively.

Even though the switching means 22 renders the voltage across a particular phase of the multi-phase output zero still there is stored energy in the load across that particular phase and a resulting current that must flow. In order to by-pass this current flow around the particular transistor of the switching means 22 and thus minimize heating of the transistors of the switching means 22, diodes 134, 136, 138, 140, 142 and 144 are connected between the emitter and collector electrodes of the respective transistors 38, 46, 54, 62, 70 and 78. For instance, when both the transistors 54 and 70 are in the conductive state, current resulting from the stored energy would flow from the output terminal 18 through the diode 142, and the collector and emitter electrodes 60 and 58, of the transistor 54, to the output terminal 16. If the stored energy does not become dissipated by the time the transistor 54 becomes non-conductive, current will also flow from the output terminal 18 through the diode 142, the source 12, and the diode 140, to the output terminal 16.

Figure 2:
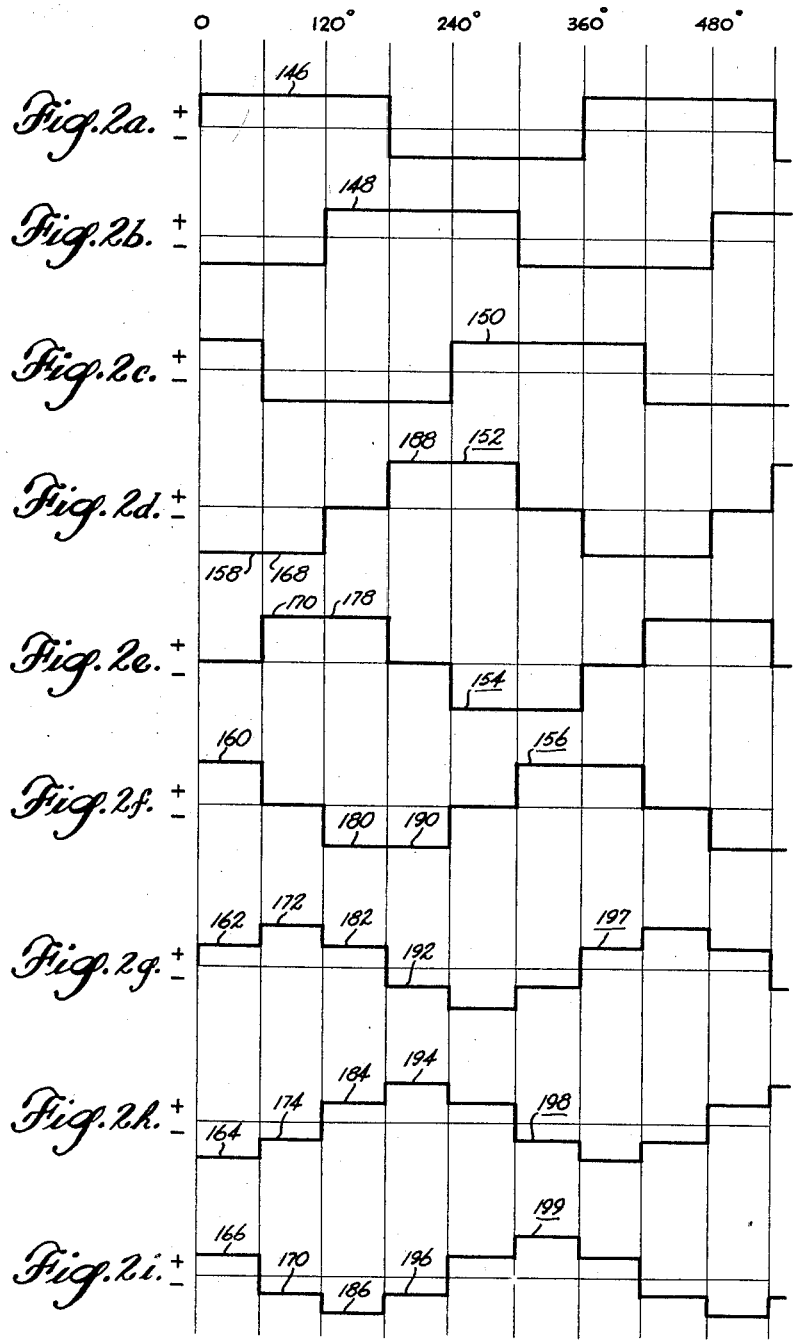
Figs. 2a through 2i are graphs illustrating voltages appearing at different points on the inverter of Fig. 1.

The operation of the three-phase inverter 10 will now be described with reference to Figs. 2a through 2i. Referring to Figs. 2a through 2c, a curve 146 represents the terminal voltage at the output terminal 14, a curve 148 represents the terminal voltage at the output terminal 16, and a curve 150 represents the terminal voltage at the output terminal 18. As can be seen from Figs. 2a through 2c, the voltage at each of the output terminals 14, 16 and 18 remains positive for 180 degrees and then is negative for the next 180 degrees. Also, as can be seen from Figs. 2a through 2c, the curve 148 is shifted 120 degrees from the curve 146 and the curve 150 is shifted another 120 degrees from the curve 148.

Referring to Fig. 2d a curve 152 represents the alternating voltage appearing between the output terminals 16 and 14. On the other hand, a curve 154 represents the next phase of the output voltage which appears between the output terminals 14 and 18. The third and remaining phase of the output voltage which appears between the output terminals 18 and 16 is represented by a curve 156.

During the first 60 degrees of operation, a voltage appears between the output terminals 16 and 14 and between the output terminals 18 and 16 in which the output terminals 14 and 18 are positive with respect to the output terminal 16. These voltages are represented at 158 and 160 in Figs. 2d and 2f. The voltage between the output terminals 16 and 14 effects a current flow through the primary winding 90, of the saturating transformer 28, in such a direction as to effect induced voltages across the secondary windings 100 and 102 of such polarity that the right ends of the secondary windings 100 and 102, as shown, are positive relative to the respective left ends. On the other hand, the voltage between the output terminals 18 and 16 effects a current flow through the primary winding 86, of the saturating transformer 24, in such a direction as to effect induced voltages across the secondary windings 92 and 94 of such polarity that the left ends of the secondary windings 92 and 94, as shown, are positive with respect to their respective right ends. Since there is no voltage between output terminals 14 and 18, the secondary windings 96 and 98 of the saturating transformer 26 have no output voltage. Thus, during the first 60 degrees of operation, the resultant control voltage appearing across the series circuit, including the secondary windings 92 and 98, as represented at 162 in Fig. 2g, is such as to render the base electrodes 40 and 48, of the transistors 38 and 46, respectively, positive relative to their respective emitter electrodes 42 and 50. Therefore, under these conditions, the transistor 38 is in a conductive state and the transistor 46 is in a non-conductive state, thereby connecting the positive side of the source of direct-current voltage 12 to the output terminal 14. As can be seen from Fig. 2a this is in accord with the curve 146 for the first 60 degrees of operation.

During the first 60 degrees of operation the resultant control voltage appearing across the series connected secondary windings 96 and 102, as represented at 164 in Fig. 2h, is such as to render the emitter electrodes 58 and 66 positive relative to their respective base electrodes 56 and 64, to thereby maintain the transistor 62 conductive and the transistor 54 non-conductive during this period. This maintains the negative side of the source of direct-current voltage 12 connected to the output terminal 16 which is in accord with the curve 148 of Fig. 2b. During this same time interval the resultant control voltage appearing across the series connected secondary windings 100 and 94, as represented at 166 in Fig. 2i, is such as to render the base electrodes 72 and 80 positive relative to their respective emitter electrodes 74 and 82, to thus maintain the transistor 70 conductive and the transistor 78 non-conductive during this time interval. This maintains the positive side of the source of direct-current voltage 12 connected to the output terminal 18 which is in accord with the curve 150 of Fig. 2c. Since each of the saturating transformers 24, 26 and 28 are so constructed that they saturate after a voltage has been applied to their respective primary windings 86, 88 and 90 for a period of 120 degrees of operation, at the end of the 60 degrees of operation, as shown in Figs. 2a through 2i, the saturating transformer 24 saturates.

In the second 60 degrees of operation a voltage appears between the output terminals 16 and 14 and between the output terminals 18 and 14 in which the output terminal 14 is positive with respect to the output terminals 16 and 18. These voltages are represented at 168 and 170 in Figs. 2d and 2e. The voltage between the output terminals 16 and 14 effects a current flow through the primary winding 90, of the saturating transformer 28, in such a direction as to effect induced voltages across the secondary windings 100 and 102 of such polarity that the right ends of the secondary windings 100 and 102, as shown, are positive relative to their respective left ends. On the other hand, the voltage between the output terminals 14 and 18 effects a current flow through the primary winding 88, of the saturating transformer 26, in such a direction as to effect induced voltages across the secondary windings 96 and 98 of such polarity that the left ends of the secondary windings 96 and 98, as shown, are positive relative to their respective right ends. Thus, during the second 60 degrees of operation the resultant control voltage appearing across the series connected secondary windings 92 and 98, as represented at 172 in Fig. 2g, is such as to hold the base electrodes 40 and 48 positive relative to their respective emitter electrodes 42 and 50, to thereby hold the transistor 38 conductive and the transistor 46 non-conductive. Thus under these conditions the positive side of the source of direct-current voltage 12 is maintained connected to the output terminal 14 which is in accord with the curve 146 of Fig. 2a.

Also during the second 60 degrees of operation a resultant control voltage appears across the series connected secondary windings 96 and 102, as represented at 174 of Fig. 2h, which is of such polarity as to hold the transistor 62 conductive and the transistor 54 non-conductive, to thereby maintain the connection of the output terminal 16 to the negative side of the source of direct-current voltage 12. As can be seen from Fig. 2b this is in accord with the curve 148. During the same time interval the resultant control voltage appearing across the series connected secondary windings 100 and 94, as represented at 176 in Fig. 2i, is such as to render the emitter electrodes 74 and 82 positive relative to their respective base electrodes 72 and 80 to thereby effect a switching operation of the transistors 70 and 78 at the beginning of the second 60 degrees of operation which renders the transistor 78 conductive and the transistor 70 non-conductive. In other words, the switching voltage across the secondary winding 100 becomes effective at the end of the time interval of the holding voltage appearing across the secondary winding 94 to effect a switching operation of the transistors 70 and 78. In this case the end of the time interval of the holding voltage is at the end of the first 60 degrees of operation. Under these conditions the output terminal 18 is connected to the negative side of the source of direct-current voltage 12, this being in accord with the curve 150 shown in Fig. 2c. At the end of the second 60 degrees of operation the saturating transformer 28 saturates.

During the third 60 degrees of operation a voltage appears between the output terminals 14 and 18 and between the output terminals 18 and 16 in which the output terminals 14 and 16 are positive with respect to the output terminal 18. These voltages are represented at 178 and 180 in Figs. 2e and 2f. The voltage between the output terminals 14 and 18 effects a current flow through the primary winding 88, of the saturating transformer 26, in such a direction as to effect induced voltages across the secondary windings 96 and 98 of such polarity that the left ends of the secondary windings 96 and 98, as shown, are positive relative to their respective right ends. On the other hand, the voltage between the output terminals 18 and 16 effects a current flow through the primary winding 86, of the saturating transformer 24, in such a direction as to effect induced voltages across the secondary windings 92 and 94 of such polarity that the right ends of the secondary windings 92 and 94, as shown, are positive relative to their respective left ends. Therefore, during the third 60 degrees of operation, the resultant control voltage appearing across the series connected secondary windings 92 and 98, as represented at 182 in Fig. 2g, is such as to hold the base electrodes 40 and 48 positive relative to their respective emitter electrodes 42 and 50, to thereby hold the transistor 38 conductive and the transistor 46 non-conductive. Thus, during the third 60 degrees of operation the output terminal 14 is maintained connected to the positive side of the source of direct-current voltage 12, this being in accord with the curve 146 of Fig. 2a.

Simultaneously during the third 60 degrees of operation a resultant control voltage appears across the series connected secondary windings 96 and 102, as represented at 184 in Fig. 2h, which is of such polarity as to render the base electrodes 56 and 64 positive relative to their respective emitter electrodes 58 and 66, to thereby switch the transistors 54 and 62 at the beginning of the third 60 degrees of operation and hold the transistor 54 conductive and the transistor 62 non-conductive during the third 60 degrees of operation. Thus, during the latter time interval the output terminal 16 is connected to the positive side of the source of direct-current voltage 12. This is in accord with the curve 148 of Fig. 2b. At the end of the third 60 degrees of operation the saturating transformer 26 becomes saturated. Also during the third 60 degrees of operation the resultant control voltage appearing across the series connected secondary windings 100 and 94, as represented at 186 in Fig. 2i, is such as to hold the emitter electrodes 74 and 82 positive relative to their respective base electrodes 72 and 80, to thereby maintain the transistor 78 conductive and the transistor 70 non-conductive, to thus maintain the connection of the output terminal 18 to the negative side of the source of direct-current voltage 12. This is in accord with the curve 150 shown in Fig. 2c.

During the fourth 60 degrees of operation a voltage appears between the output terminals 16 and 14 and between the output terminals 18 and 16 in which the output terminal 16 is positive with respect to the output terminals 14 and 18. These voltages are represented at 188 and 190 in Figs. 2d and 2f. The voltage between the output terminals 16 and 14 effects a current flow through the primary winding 90, of the saturating transformer 28, in such a direction as to effect induced voltages across the secondary windings 100 and 102 of such polarity that the left ends of the secondary windings 100 and 102, as shown, are positive relative to their respective right ends. The voltage between the output terminals 18 and 16 effects a current flow through the primary winding 86, of the saturating transformer 24, in such a direction as to effect induced voltages across the secondary windings 92 and 94 of such polarity that the right ends of the secondary windings 92 and 94, as shown, are positive relative to their respective left ends. Thus, during the fourth 60 degrees of operation, the resultant control voltage appearing across the series connected secondary windings 92 and 98, as represented at 192 in Fig. 2g, is such as to render the emitter electrodes 42 and 50 positive relative to their respective base electrodes 40 and 48 to thereby effect a switching operation of the transistors 38 and 46 at the beginning of the fourth 60 degrees of operation and a maintaining of the transistor 46 conductive and the transistor 38 non-conductive during the fourth 60 degrees of operation. Thus, under these conditions the output terminal 14 is connected to the negative side of the source of direct-current voltage 12, this being in accord with the curve 146 of Fig. 2a.

Simultaneously during the fourth 60 degrees of operation a resultant control voltage appears across the series connected secondary windings 96 and 102, as represented at 194 in Fig. 2h, which is of such polarity as to hold the transistor 54 conductive and the transistor 62 nonconductive, to thereby maintain the output terminal 16 connected to the positive side of the source of direct-current voltage 12, this being in accord with the curve 148 shown in Fig. 2b. Also during the fourth 60 degrees of operation the resultant control voltage appearing across the series connected secondary windings 100 and 94, as represented at 196 in Fig. 2i, is such as to maintain the transistor 78 conductive and the transistor 70 non-conductive to thus maintain the connection between the output terminal 18 and the negative side of the source of direct-current voltage 12, this being in accord with the curve 150 shown in Fig. 2c. At the end of the fourth 60 degrees of operation the saturating transformer 24 saturates. If this sequence of operation where continued it would be found that the control voltage for the pair of transistors 32 would be represented by the curve 197, that the control voltage for the pair of transistors 34 would be represented by the curve 198, and that the control voltage for the pair of transistors 36 would be represented by the curve 199.

Figure 3:
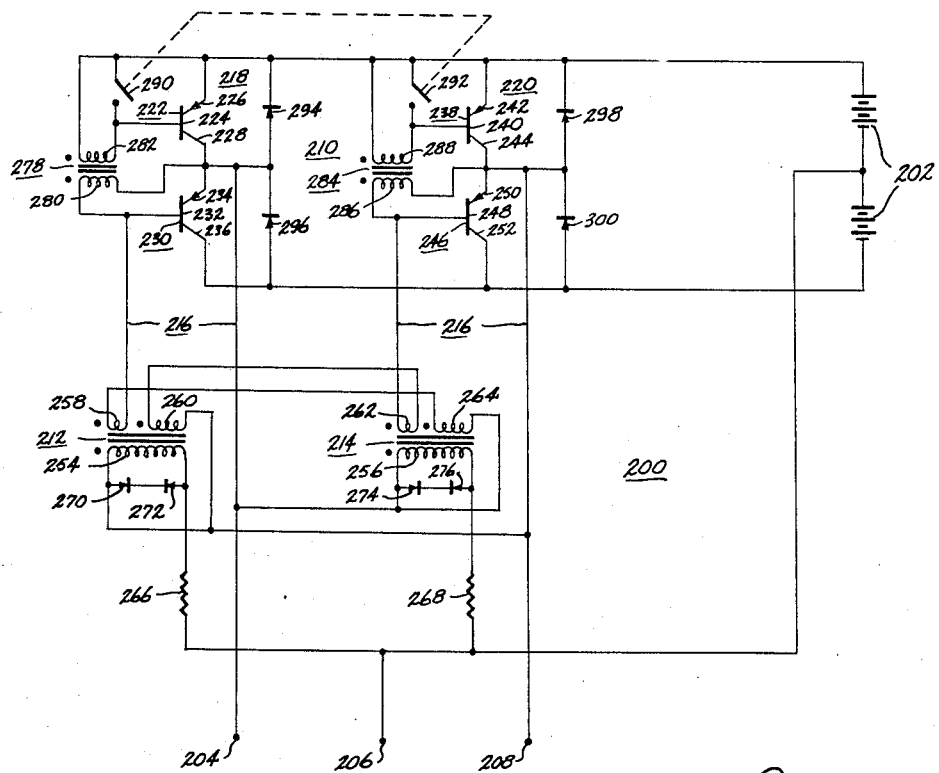
Fig. 3 is a schematic diagram of apparatus and circuits illustrating a two-phase inverter embodying further teachings of this invention.

Referring to Fig. 3 there is illustrated a two-phase inverter 200, embodying further teachings of this invention, which is connected to a center-tapped source of direct-current voltage 202 to effect at a two-phase output, including output terminals 204, 206 and 208, a two-phase alternating output voltage. In general, the two phase inverter 200 comprises switching means 210 for connecting the source of direct-current voltage 202 to each phase of the two-phase output, including the output terminals 204, 206 and 208; means, including saturating transformers 212 and 214, for obtaining two voltage measures of the voltage across each phase of the two-phase output and for combining the two voltage measures of one phase with the two voltage measures of the other phase to obtain two resultant control voltages; and circuit means 216 for applying the two resultant control voltages to the switching means 210 to control the switching operation of the switching means 210 so as to connect the source of direct-current voltage 202 to the two-phase output in a predetermined manner.

Referring more particularly to the switching means 210, the switching means 210 includes two pairs of semiconductors or transistors 218 and 220. In operation, the pair of transistors 218 functions to connect the output terminal 204 to either the positive or the negative side of the source of direct-current voltage 202. Specifically, a p-n-p junction type transistor 222, including a base electrode 224, an emitter electrode 226, and a collector electrode 228, is so disposed and interconnected with the other components of the inverter 200 as to connect the positive side of the source of direct-current voltage 202 to the output terminal 204 when the transistor 222 is in the conducting state. On the other hand, a p-n-p junction type transistor 230, including a base electrode 232, an emitter electrode 234, and a collector electrode 236, is provided for connecting the negative side of the source of direct-current voltage 202 to the output terminal 204 when the transistor 230 is in the conducting state. As will be explained hereinafter the conducting or non-conducting state of the transistors 222 and 230 is dependent upon the polarity of the resultant control voltage applied to the pair of transistors 218.

In like manner, the pair of transistors 220 includes a p-n-p junction type transistor 238, including a base electrode 240, an emitter electrode 242, and a collector electrode 244, for connecting the positive side of the source of direct-current voltage 202 to the output terminal 208 when the transistor 238 is in the conducting state. A transistor 246, including a base electrode 248, an emitter electrode 250, and a collector electrode 252, is provided for connecting the output terminal 208 to the negative side of the source of direct-current voltage 202 when the transistor 246 is in the conducting state.

The saturating transformers 212 and 214 are so constructed and so interconnected between the output terminals 204, 206 and 208 and the switching means 210 as to control the switching operation of the switching means 210 in such a manner as to effect the two-phase alternating voltage across the output terminals 204, 206 and 208. Further, the saturating transformers 212 and 214 are so constructed that they each saturate after a voltage has been applied to their respective primary windings 254 and 256 for a period of 180 degrees of operation. In this instance, the saturating transformers 212 and 214 comprise the primary windings 254 and 256, respectively, and secondary windings 258 and 260, and secondary windings 262 and 264, respectively. As illustrated, the saturating transformers 212 and 214 are connected to be responsive to each phase of the two-phase output voltage appearing across the output terminals 204, 206 and 208. In particular, the primary winding 254, of the saturating transformer 212, is connected between the output terminals 206 and 208. On the other hand, the primary winding 256, of the saturating transformer 214, is connected between the output terminals 204 and 206.

In order to limit the magnitude of the current flow through the primary windings 254 and 256 to a predetermined or fixed value and thus render the operation of the two-phase inverter 200 substantially independent of changes in the magnitude of a load (not shown) connected to the output terminals 204, 206 and 208, current-limiting resistors 266 and 268 are connected in series circuit relationship with the primary windings 254 and 256, respectively.

For the purpose of maintaining the frequency of oscillation of the two-phase inverter 200 substantially independent of changes in the magnitude of the source of direct-current voltage 202 a plurality of zener diodes 270, 272, 274 and 276 are provided. In operation, the magnitude of the source of direct-current voltage 202 is such that the zener diodes 270, 272, 274 and 276 are always operating in the zener characteristic, thus maintaining the magnitude of the voltage across the primary windings 254 and 256 substantially constant irrespective of the magnitude of the source of direct-current voltage 202 provided the particular saturating transformer 212 or 214 is in the non-saturated state. However, even if the diodes 270, 272, 274 and 276 were not provided still the magnitude of the voltages appearing across the primary windings 254 and 256 would change a lesser amount proportionately than the change in the magnitude of the voltage across the source of direct-current voltage 202. The reason for this is that the voltage appearing across the primary windings 254 and 256 is dependent upon the base-emitter voltages of the pairs of transistors 218 and 220. A change in the magnitude of the source of direct-current voltage 202 changes the magnitude of the base currents supplied to the transistors of the pairs of transistors 218 and 220 but owing to the voltage-current characteristic of these transistors the base-emitter voltages of the transistors do not change as rapidly as do the base-emitter currents and therefore the voltages reflected back to the primary windings 254 and 256 likewise do not change proportionately as much for a given change in the magnitude of the voltage of the source of direct-current voltage 202.

As can be seen from Fig. 3, the secondary windings 260 and 264 have a greater number of turns than their associated secondary windings 258 and 262, respectively.

In operation a measure of the voltage appearing between the output terminals 204 and 206 appears across both the secondary windings 262 and 264 when the saturating transformer 214 is in a non-saturated state. On the other hand, a measure of the alternating voltage appearing between the output terminals 206 and 208 appears across both the secondary windings 258 and 260 when the saturating transformer 212 is in an non-saturated state.

In order to combine a measure of the voltage appearing between the output terminals 204 and 206 with a measure of the alternating voltage appearing between the output terminals 208 and 206, the secondary winding 258, of the saturating transformer 212, is connected in series circuit relationship with the secondary winding 264, of the saturating transformer 214. The resultant control voltage appearing across the secondary windings 258 and 264 is applied to the transistor 230 by connecting one end of the series circuit, including the secondary windings 258 and 264, to the base electrode 232 and by connecting the other end of the series circuit to the emitter electrode 234, of the transistor 230. For the purpose of applying a measure of this latter resultant control voltage between the base electrode 224 and the emitter electrode 226, of the transistor 222, a non-saturating transformer 278, having a primary winding 280 and a secondary winding 282, is provided. Specifically, the primary winding 280, of the transformer 278, is connected to be responsive to the resultant control voltage appearing across the secondary windings 258 and 264. On the other hand, the secondary winding 282, of the transformer 278, is so connected to the base electrode 224 and the emitter electrode 226, of the transistor 222, that when the base electrode 232, of the transistor 230, is positive with respect to its associated emitter electrode 234, the base electrode 224, of the transistor 222, is negative with respect to its associated emitter electrode 226. Thus, by providing the transformer 278 and by properly interconnecting it with the transistors 222 and 230 both the transistors 222 and 230 can be of the p-n-p junction type and yet provide the desired switching operation.

The secondary winding 262, of the saturating transformer 214, is connected in series circuit relationship with the secondary winding 260, of the saturating transformer 212, in order to combine a measure of the alternating voltage appearing between the output terminals 204 and 206 with a measure of the alternating voltage appearing between the output terminals 208 and 206. The resultant control voltage appearing across the secondary windings 262 and 260 is applied to the transistor 246 by connecting one end of the series circuit, including the secondary windings 262 and 260, to the base electrode 248 and by connecting the other end of the series circuit to the emitter electrode 250, of the transistor 246. A measure of the latter resultant control voltage is applied between the base electrode 240 and the emitter electrode 242, of the transistor 238, by means of a non-saturating transformer 284 having a primary winding 286 and a secondary winding 288. As can be seen from Fig. 3, the secondary winding 288, of the transformer 284, is so connected to the base electrode 240 and to the emitter electrode 242, of the transistor 238, as to provide a control voltage for the transistor 238 which is of opposite polarity to control voltage that is simultaneously applied to the transistor 246. This, of course, permits both the transistors 238 and 246 to be of the p-n-p junction type.

The on-off operation of the two-phase inverter 200 is controlled by mechanically ganged switches 290 and 292. As illustrated, the switches 290 and 292 are so interconnected with other components of the two-phase inverter 200 that when they are actuated to the circuit closed position they effectively short out the control voltages applied to the transistors 222, 230, 238 and 246.

For the purpose of minimizing heating of the transistors 222, 230, 238 and 246 due to energy being stored in the load (not shown) connected to the output terminals 204, 206 and 208 diodes 294, 296, 298 and 300 are connected between the emitter and collector electrodes of the respective transistors 222, 230, 238 and 246.

The operation of the two-phase inverter 200 will now be described with reference to Figs. 4a through 4d. Referring to Figs. 4a and 4b, a curve 302 represents the alternating voltage appearing between the output terminals 204 and 206 and a curve 304 represents the alternating voltage appearing between the output terminals 208 and 206, the output terminal 206 being common to both the output terminals 204 and 208. As can be seen from Figs. 4a and 4b the alternating output voltage appearing between the output terminals 204 and 206 leads the alternating output voltage appearing between the output terminals 208 and 206 by 90 degrees.

During the first 90 degrees of operation, as illustrated in Figs. 4a through 4d, a voltage appears between the output terminals 204 and 206 and between the output terminals 208 and 206 in which the output terminal 204 is positive with respect to the common output terminal 206 and the output terminal 208 is negative with respect to the common output terminal 206. These voltages are represented at 306 and 308 in Figs. 4a and 4b. The voltage between the output terminals 204 and 206 effects a current flow through the primary winding 256, of the saturating transformer 214, in such a direction as to effect induced voltages across the secondary windings 262 and 264 of such polarity that the left ends of the secondary windings 262 and 264, as shown, are positive relative to their respective right ends. For descriptive purposes the voltage across the secondary winding 264 is called a holding voltage and the voltage across the secondary winding 262 is called a switching voltage. On the other hand, the voltage between the output terminal 208 and the output terminal 206 effects a current flow through the primary winding 254, of the saturating transformer 212, in such a direction as to effect induced voltages across the secondary windings 258 and 260 of such polarity that the right ends of the secondary windings 258 and 260, as shown, are positive relative to their respective left ends. For descriptive purposes the voltage across the secondary winding 260 is called a holding voltage and the voltage across the secondary winding 258 is called a switching voltage. Thus, during the first 90 degrees of operation the resultant control voltage appearing across the series connected secondary windings 258 and 264, as represented at 310 in Fig. 4c, is such as to render the base electrode 232, of the transistor 230, positive with respect to its associated emitter electrode 234, and the base electrode 224, of the transistor 222, negative with respect to its associated emitter electrode 226. Therefore, under these conditions the transistor 222 is in a conductive state and the transistor 230 is in a non-conductive state, thereby connecting the output terminal 204 to the positive side of the source of direct-current voltage 202.

Also during the first 90 degrees of operation the resultant control voltage appearing across the series connected secondary windings 262 and 260, as represented at 312 in Fig. 4d, is such as to render the emitter electrode 250, of the transistor 246, positive with respect to its associated base electrode 248, and the base electrode 240, of the transistor 238, positive with respect to its associated emitter electrode 242, to thereby render the transistor 246 conductive and the transistor 238 non-conductive. This connects the negative side of the source of direct-current voltage 202 to the output terminal 208. At the end of the first 90 degrees of operation the saturating transformer 212 becomes saturated.

During the second 90 degrees of operation a voltage appears between the output terminals 204 and 206 and between the output terminals 208 and 206 in which the output terminals 204 and 208 are both positive with respect to the common output terminal 206. These voltages are represented at 314 and 316 in Figs. 4a and 4b. The voltage between the output terminals 204 and 206 effects a current flow through the primary winding 256, of the saturating transformer 214, in such a direction as to effect induced voltages across the secondary windings 262 and 264 of such polarity that the left ends of the secondary windings 262 and 264, as shown, are positive relative to their respective left ends. On the other hand, the voltage between the output terminals 208 and 206 effects a current flow through the primary winding 254, of the saturating transformer 212, in such a direction as to effect induced voltages across the secondary windings 258 and 260 of such polarity that the left ends of the secondary windings 258 and 260, as shown, are positive relative to their respective right ends. Thus, during the second 90 degrees of operation the resultant control voltage appearing across the series connected secondary windings 258 and 264, as represented at 318 in Fig. 4c, is such as to hold the transistor 222 conductive and the transistor 230 non-conductive. Thus, under these conditions, the positive side of the source of direct-current voltage 202 is maintained connected to the output terminal 204.

Simultaneously during the second 90 degrees of operation a resultant control voltage appears across the series connected secondary windings 262 and 260, as represented at 320 in Fig. 4d, which is of such polarity as to render the transistor 238 conductive and the transistor 246 non-conductive. This connects the output terminal 208 to the positive side of the source of direct-current voltage 202. At the end of the second 90 degrees of operation the saturating transformer 214 becomes saturated.

During the third 90 degrees of operation a voltage appears between the output terminals 204 and 206 and between the output terminals 208 and 206 in which the output terminal 208 is positive with respect to the common output terminal 206 and the output terminal 204 is negative with respect to the common output terminal 206. These voltages are illustrated at 322 and 324 in Figs. 4a and 4b. The voltage between the output terminals 204 and 206 effects a current flow through the primary winding 256, of the saturating transformer 214, in such a direction as to effect induced voltages across the secondary windings 262 and 264 of such polarity that the right ends of the secondary windings 262 and 264, as shown, are positive relative to their respective left ends. On the other hand, the voltage between the output terminals 208 and 206 effects a current flow through the primary winding 254, of the saturating transformer 212, in such a direction as to effect induced voltages across the secondary windings 258 and 260 of such polarity that the left ends of the secondary windings 258 and 260, as shown, are positive relative to their respective right ends. Therefore, during the third 90 degrees of operation the resultant control voltage appearing across the series connected secondary windings 258 and 264, as represented at 326 in Fig. 4c, is such as to effect a switching of the transistors 222 and 230 so as to render the transistor 230 conductive and the transistor 222 non-conductive. This connects the output terminal 204 to the negative side of the source of direct-current voltage 202.

Also during the third 90 degrees of operation a resultant control voltage appears across the series connected secondary windings 262 and 260, as represented at 328 in Fig. 4d, which is of such polarity as to maintain the transistor 238 conductive and the transistor 246 non-conductive. Therefore, the output terminal 208 remains connected to the positive side of the source of direct-current voltage 202. At the end of the third 90 degrees of operation the saturating transformer 212 becomes saturated.

During the fourth 90 degrees of operation a voltage appears between the output terminals 204 and 206 and between the output terminals 208 and 206 in which both the output terminals 204 and 208 are negative with respect to the common output terminal 206. These voltages are represented at 330 and 332 in Figs. 4a and 4b. The voltage between the output terminals 208 and 206 effects a current flow through the primary winding 254, of the saturating transformer 212, in such a direction as to effect induced voltages across the secondary windings 258 and 260 of such polarity that the right ends of the secondary windings 258 and 260, as shown, are positive relative to their respective left ends. The voltage between the output terminals 204 and 206 effects a current flow through the primary winding 256, of the saturating transformer 214, in such a direction as to effect induced voltages across the secondary windings 262 and 264 of such polarity that the right ends of the secondary windings 262 and 264, as shown, are positive relative to their respective left ends. Thus, during the fourth 90 degrees of operation the resultant control voltage appearing across the series connected secondary windings 258 and 264, as represented at 334 in Fig. 4c, is such as to maintain the transistor 230 conductive and the transistor 222 non-conductive. Therefore, the output terminal 204 remains connected to the negative side of the source of direct-current voltage 202.

Also during the fourth 90 degrees of operation a resultant control voltage appears across the series connected secondary windings 262 and 260, as represented at 336 in Fig. 4d, which is of such polarity as to render the transistor 246 conductive and the transistor 238 non-conductive at the beginning of the fourth 90 degrees of operation and maintain this condition during the fourth 90 degrees of operation. This action connects the output terminal 208 to the negative side of the source of direct-current voltage 202. At the end of the fourth 90 degrees of operation the saturating transformer 214 becomes saturated.

It is to be understood that frequency control means similar to that shown in Fig. 1 could be incorporated into the two-phase inverter 200, of Fig. 3, in order to effect frequency control; provided the zener diodes 270, 272, 274 and 276 are removed. It is also to be understood that all p-n-p or all n-p-n junction type transistors could be utilized in the inverters 10 and 200, of Figs. 1 and 3 by providing transformers such as the transformers 278 and 284 as shown in Fig. 3. Further, suitable point contact type transistors could be substituted for the junction type transistors shown in Figs. 1 and 3.

The apparatus embodying the teachings of this invention has several advantages. For instance, it is to be noted that the maximum voltage applied between the emitter and collector electrodes of the respective transistors shown in Fig. 1 is the voltage across the source of direct-current voltage. Therefore, a maximum of power output is obtained from the inverter 10 shown in Fig. 1 for a given size transistor. In addition, the frequency of oscillation of the inverters 10 and 200 embodying the teachings of this invention is substantially independent of changes in the magnitude of the load connected to the output of the particular inverter. Further, the frequency of operation of the inverter 200 is substantially independent of changes in the magnitude of the voltage across the source of direct-current voltage. Also, the frequency of oscillation of the inverters embodying the teachings of this invention can be readily changed.

Since certain changes may be made in the above described apparatus and circuits and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a multi-phase inverter adapted to be connected to a source of direct-current voltage and to effect at a multi-phase output a multi-phase alternating output voltage, the combination comprising, switching means for connecting the source of direct-current voltage to each phase of the multi-phase output, means responsive to each phase of the multi-phase alternating output voltage for combining a measure of the alternating output voltage across one phase of the multi-phase output with a measure of the alternating output voltage across one of the other phases of the multi-phase output to obtain a plurality of resultant control voltages, and circuit means for applying said resultant control voltages to said switching means, to thus connect the source of direct-current voltage to the multi-phase output in a predetermined manner.

2. In a multi-phase inverter adapted to be connected to a source of direct-current voltage and to effect at a plurality of output terminals a multi-phase alternating output voltage, the combination comprising, switching means for connecting the source of direct-current voltage to the plurality of output terminals, means responsive to each phase of the multi-phase alternating output voltage for producing a holding voltage for a predetermined time interval for each of the plurality of output terminals and a switching voltage for a predetermined time interval for each of the plurality of output terminals, the holding voltage for each of the plurality of output terminals being out of phase with the switching voltage associated with the same output terminal, and circuit means for so combining each holding voltage with its associated switching voltage and for applying the resultant control voltage to said switching means that the associated switching voltage becomes effective at the end of the time interval of the holding voltage to effect a switching operation of said switching means and thereby connect the source of direct-current voltage to the plurality of output terminals in a predetermined manner.

3. In an inverter adapted to be connected to a source of direct-current voltage and to effect an alternating voltage across each phase of a multi-phase output, the combination comprising, a plurality of saturating transformers each of which includes a primary winding means and two secondary winding means, circuit means for rendering each of said plurality of primary winding means responsive to respectively different phase output voltages appearing at the multi-phase output, switching means interconnected between the source of direct-current voltage and the multi-phase output, other circuit means for interconnecting one of the secondary winding means of each of the plurality of saturating transformers with one of the remaining secondary winding means associated with a separate and distinct saturating transformer of the plurality of saturating transformers to obtain a plurality of resultant control voltages, and further circuit means for applying said resultant control voltages to said switching means to control the switching of said switching means to thus effect the alternating voltage across each phase of the multi-phase output.

4. In an inverter adapted to be connected to a source of direct-current voltage and to effect an alternating voltage across each phase of a multi-phase output, the combination comprising, a plurality of saturating transformers each of which includes a primary winding means and two secondary winding means, the two secondary winding means of each saturating transformer being such that a larger voltage is induced across one of the secondary winding means than is induced across the other secondary winding means, circuit means for rendering each of said plurality of primary winding means responsive to respectively different phase output voltages appearing at the multi-phase output, switching means interconnected between the source of direct-current voltage and the multi-phase output, other circuit means for interconnecting said one of the secondary winding means of each of the plurality of saturating transformers with one of said other secondary winding means associated with a separate and distinct saturating transformer of the plurality of saturating transformers to obtain a plurality of resultant control voltages, and further circuit means for applying said resultant control voltages to said switching means to control the switching of said switching means, to thus effect the alternating voltage across each phase of the multi-phase output.

5. In an inverter adapted to be connected to a source of direct-current voltage and to effect an alternating voltage across each phase of a multi-phase output, the combination comprising, a plurality of saturating transformers each of which includes a primary winding means and two secondary winding means, the two secondary winding means of each saturating transformer being such that a larger voltage is induced across one of the secondary winding means than is induced across the other secondary winding means, circuit means for limiting the current flow through the plurality of primary winding means and for rendering each of said plurality of primary winding means responsive to respectively different phase output voltages appearing at the multi-phase output, switching means interconnected between the source of direct-current voltage and the multi-phase output, other circuit means for interconnecting said one of the secondary winding means of each of the plurality of saturating transformers with one of said other secondary winding means associated with a separate and distinct saturating transformer of the plurality of saturating transformers to obtain a plurality of resultant control voltages, and further circuit means for applying said resultant control voltages to said switching means to control the switching of said switching means, to thus effect the alternating voltage across each phase of the multi-phase output.

6. In a three-phase inverter adapted to be connected to a source of direct-current voltage and to effect at a three-phase output a three-phase alternating output voltage, the combination comprising, switching means for connecting the source of direct-current voltage to each phase of the three-phase output, means for obtaining two voltage measures of the voltage across each phase of the three-phase output and for combining one of said two voltage measures of each phase of the three-phase output with one of the voltage measures of a preceding phase of the three-phase output and for combining the other of said two voltage measures of each phase of the three-phase output with one of the voltage measures of a succeeding phase of the three-phase output to obtain a plurality of resultant control voltages, and circuit means for applying said resultant control voltages to said switching means, to thus connect the source of direct-current voltage to the three-phase output in a predetermined manner.

7. In a three-phase inverter adapted to be connected to a source of direct-current voltage and to effect at a three-phase output a three-phase alternating output voltage, the combination comprising, switching means for connecting the source of direct-current voltage to each phase of the three-phase output, three saturating transformers each including a primary winding means and two secondary winding means, circuit means for rendering each of said plurality of primary winding means responsive to respectively different phase output voltages appearing at the three-phase output, other circuit means for connecting one of the secondary winding means of each of the three saturating transformers to one of the secondary winding means whose associated primary winding means is connected to be responsive to a preceding phase of the three-phase output and for connecting the other secondary winding means of each of the three saturating transformers to one of the secondary winding means whose associated primary winding means is connected to be responsive to a succeeding phase of the three-phase output to thus obtain a plurality of resultant control voltages, and further circuit means for applying said resultant control voltages to said switching means, to thus connect the source of direct-current voltage to the three-phase output in a predetermined manner.

8. In a three-phase inverter adapted to be connected to a source of direct-current voltage and to effect between a first, a second and a third output terminal an alternating three-phase voltage, the combination comprising, three saturating transformers each of which includes a primary winding means and two secondary winding means, circuit means for connecting the primary winding means of one of the three saturating transformers between the first and the second output terminal, other circuit means for connecting the primary winding means of another of the three saturating transformers between the second and the third output terminal, further circuit means for connecting the primary winding means of the last of the three saturating transformers between the third and the first output terminal, switching means interconnected between the source of direct-current voltage and the first, second and third output terminal, still other circuit means for interconnecting one of the secondary winding means of said one of the three saturating transformers with one of the secondary winding means of said last of the three saturating transformers and for applying the resultant control voltage appearing across said two interconnected secondary winding means to said switching means to connect the second output terminal to said source, still further circuit means for interconnecting the other of the secondary winding means of said last of the three saturating transformers with one of the secondary winding means of said another of the three saturating transformers and for applying the resultant control voltage appearing across said last mentioned two interconnected secondary winding means to said switching means to connect the first output terminal to said source, and still other circuit means for interconnecting the other secondary winding means of said another of the three saturating transformers with the other of the secondary winding means of said one of the three saturating transformers and for applying the resultant control voltage appearing across the last mentioned two interconnected secondary winding means to said switching means to connect the third output terminal to said source.

9. In a three-phase inverter adapted to be connected to a source of direct-current voltage and to effect between a first, a second and a third output terminal an alternating three-phase voltage, the combination comprising, three saturating transformers each of which includes a primary winding means and two secondary winding means, circuit means, including a current-limiting impedance member, for connecting the primary winding means of one of the three saturating transformers between the first and the second output terminal, other circuit means, including another current-limiting impedance member, for connecting the primary winding means of another of the three saturating transformers between the second and the third output terminal, further circuit means, including a further current-limiting impedance member, for connecting the primary winding means of the last of the three saturating transformers between the third and the first output terminal, switching means interconnected between the source of direct-current voltage and the first, second and third output terminal, still another circuit means for interconnecting one of the secondary winding means of said one of the three saturating transformers with one of the secondary winding means of said last of the three saturating transformers and for applying the resultant control voltage appearing across said two interconnected secondary winding means to said switching means to connect the second output terminal to said source, still further circuit means for interconnecting the other of the secondary winding means of said last of the three saturating transformers with one of the secondary winding means of said another of the three saturating transformers and for applying the resultant control voltage appearing across said last mentioned two interconnected secondary winding means to said switching means to connect the first output terminal to said source, and still other circuit means for interconnecting the other secondary winding means of said another of the three saturating transformers with the other of the secondary winding means of said one of the three saturating transformers and for applying the resultant control voltage appearing across the last mentioned two interconnected secondary winding means to said switching means to connect the third output terminal to said source.

10. In a three-phase inverter adapted to be connected to a source of direct-current voltage and to effect between a first, a second and a third output terminal an alternating three-phase voltage, the combination comprising, three saturating transformers each of which includes a primary winding means and a first and a second secondary winding means, the first secondary winding means of each of the three saturating transformers having a substantially greater number of turns than the second secondary winding means of the same saturating transformer, circuit means, including a current-limiting impedance member, for connecting the primary winding means of one of the three saturating transformers between the first and the second output terminal, other circuit means, including another current-limiting impedance member, for connecting the primary winding means of another of the three saturating transformers between the second and the third output terminal, further circuit means, including a further current-limiting impedance member, for connecting the primary winding means of the last of the three saturating transformers between the third and the first output terminal, switching means interconnected between the source of direct-current voltage and the first, second and third output terminal, still other circuit means for interconnecting the first secondary winding means of said one of the three saturating transformers with the second secondary winding means of said last of the three saturating transformers and for applying the resultant control voltage appearing across said two interconnected secondary winding means to said switching means to connect the second output terminal to said source, still further circuit means for interconnecting the first secondary winding means of said last of the three saturating transformers with the second secondary winding means of said another of the three saturating transformers and for applying the resultant control voltage appearing across said last two mentioned interconnected secondary winding means to said switching means to connect the first output terminal to said source, and still other circuit means for interconnecting the first secondary winding means of said another of the three saturating transformers with the second secondary winding means of said one of the three saturating transformers and for applying the resultant control voltage appearing across the last mentioned two interconnected secondary winding means to said switching means to connect the third output terminal to said source.

11. In a three-phase inverter adapted to be connected to a source of direct-current voltage having a positive and a negative side and to effect between a first, a second and a third output terminal an alternating three-phase voltage, the combination comprising, three saturating transformers each of which includes a primary winding means and a first and a second secondary winding means, the first secondary winding means of each of the three saturating transformers having a substantially greater number of turns than the second secondary winding means of the same saturating transformer, circuit means, including a current-limiting impedance member, for connecting the primary winding means of one of the three saturating transformers between the first and the second output terminal, other circuit means, including another current-limiting impedance member, for connecting the primary winding means of another of the three saturating transformers between the second and the third output terminal, further circuit means, including a further current-limiting impedance member, for connecting the primary winding means of the last of the three saturating transformers between the third and the first output terminal, a pair of switching transistors for selectively connecting the first output terminal to either the positive or the negative side of the source of direct-current voltage, another pair of switching transistors for selectively connecting the second output terminal to either the positive or the negative side of the source of direct-current voltage, a further pair of switching transistors for selectively connecting the third output terminal to either the positive or the negative side of the source of direct-current voltage, still other circuit means for interconnecting the first secondary winding means of said one of the three saturating transformers with the second secondary winding means of said last of the three saturating transformers and for applying the resultant control voltage appearing across said two interconnected secondary winding means to said another pair of switching transistors to control the switching operation of said another pair of switching transistors, still further circuit means for interconnecting the first secondary winding means of said last of the three saturating transformers with the second secondary winding means of said another of the three saturating transformers and for applying the resultant control voltage appearing across said last mentioned two interconnected secondary winding means to said pair of switching transistors associated with the first output terminal to control the switching operation of said last mentioned pair of switching transistors, and still other circuit means for interconnecting the first secondary winding means of said another of the three saturating transformers with the second secondary winding means of said one of the three saturating transformers and for applying the resultant control voltage appearing across the last mentioned two interconnected secondary winding means to said further pair of switching transistors to control the switching operation of said further pair of switching transistors.

12. In a three-phase inverter adapted to be connected to a source of direct-current voltage having a positive and a negative side and to effect between a first, a second and a third output terminal an alternating three-phase voltage, the combination comprising, three saturating transformers each of which includes a primary winding means and two secondary winding means, circuit means for connecting the primary winding means of one of the three saturating transformers between the first and the second output terminal, other circuit means for connecting the primary winding means of another of the three saturating transformers between the second and the third output terminal, further circuit means for connecting the primary winding means of the last of the three saturating transformers between the third and the first output terminal, a pair of switching transistors for selectively connecting the first output terminal to either the positive or the negative side of the source of direct-current voltage, another pair of switching transistors for selectively connecting the second output terminal to either the positive or the negative side of the source of direct-current voltage, a further pair of switching transistors for selectively connecting the third output terminal to either the positive or negative side of the source of direct-current voltage, still other circuit means for connecting one of the secondary winding means of said one of the three saturating transformers in series circuit relationship with one of the secondary winding means of said last of the three saturating transformers and with a variable impedance member and for connecting said series circuit to said another pair of switching transistors to control the switching operation of said another pair of switching transistors, still further circuit means for connecting the other of the secondary winding means of said last of the three saturating transformers in series circuit relationship with one of the secondary winding means of said another of the three saturating transformers and with another variable impedance member and for connecting said last mentioned series circuit to said pair of switching transistors associated with the first output terminal to control the switching operation of said last mentioned pair of switching transistors, and still other circuit means for connecting the other secondary winding means of said another of the three saturating transformers in series circuit relationship with the other of the secondary winding means of said one of the three saturating transformers and with a further variable impedance member and for connecting said last mentioned series circuit to said further pair of switching transistors to control the switching operation of said further pair of switching transistors.

13. In a three-phase inverter adapted to be connected to a source of direct-current voltage having a positive and a negative side and to effect between a first, a second and a third output terminal an alternating three-phase voltage, the combination comprising, three saturating transformers each of which includes a primary winding means and two secondary winding means, circuit means for connecting the primary winding means of one of the three saturating transformers between the first and the second output terminal, other circuit means for connecting the primary winding means of another of the three saturating transformers between the second and the third output terminal, further circuit means for connecting the primary winding means of the last of the three saturating transformers between the third and the first output terminal, a pair of switching transistors, each of the switching transistors having three electrodes, for selectively connecting the first output terminal to either the positive or the negative side of the source of direct-current voltage, another pair of switching transistors, each of the latter switching transistors having three electrodes, for selectively connecting the second output terminal to either the positive or the negative side of the source of direct-current voltage, a further pair of switching transistors, each of the latter switching transistors having three electrodes, for selectively connecting the third output terminal to either the positive or the negative side of the source of direct-current voltage, still other circuit means for connecting one of the secondary winding means of said one of the three saturating transformers in series circuit relationship with one of the secondary winding means of said last of the three saturating transformers and for connecting one end of said series circuit to one of the electrodes of each of the switching transistors of said another pair of switching transistors and for connecting the other end of said series circuit to another electrode of each of the switching transistors of said another pair of switching transistors, still further circuit means for connecting the other of the secondary winding means of said last mentioned of the three saturating transformers in series circuit relationship with one of the secondary winding means of said another of the three saturating transformers and for connecting one end of the last mentioned series circuit to one of the electrodes of each of the switching transistors of said pair of switching transistors associated with the first output terminal and for connecting the other end of the said last mentioned series circuit to another of the electrodes of each of the switching transistors of said pair of switching transistors associated with the first output terminal, still other circuit means for connecting the other secondary winding means of said another of the three saturating transformers in series circuit relationship with the other of the secondary winding means of said one of the three saturating transformers and for connecting one end of said last mentioned series circuit to one of the electrodes of each of the switching transistors of said further pair of switching transistors and for connecting the other end of said last mentioned series circuit to another of the electrodes of each of the switching transistors of said further pair of switching transistors, and a diode connected between said another electrode and the remaining electrode of each of the switching transistors of said another pair of switching transistors, of said further pair of switching transistors, and of said pair of switching transistors associated with the first output terminal.

14. In a two-phase inverter adapted to be connected to a source of direct-current voltage and to effect an alternating voltage across each phase of a two-phase output, the combination comprising, two saturating transformers each of which includes a primary winding means and two secondary winding means, circuit means for rendering one of said primary winding means responsive to one phase of the two-phase output and for rendering the other of said primary winding means responsive to the other phase of the two-phase output, switching means for connecting the source of direct-current voltage to the two-phase output, other circuit means for interconnecting one of the secondary winding means of one of the two saturating transformers with one of the secondary winding means of the other of the two saturating transformers and for interconnecting the other secondary winding means of said one of the two saturating transformers with the other secondary winding means of said other of the two saturating transformers to obtain two resultant control voltages, and further circuit means for applying said two resultant control voltages to said switching means, to thus connect the source of direct-current voltage to the two-phase output in a predetermined manner.

15. In a two-phase inverter adapted to be connected to a source of direct-current voltage and to effect an alternating voltage across each phase of a two-phase output, the combination comprising two saturating transformers each of which includes a primary winding means and a first and a second secondary winding means, the first secondary winding means of each of the two saturating transformers having a greater number of turns than the second secondary winding means of the same saturating transformer, circuit means, including a current-limiting impedance member, for rendering one of said primary winding means responsive to one phase of the two-phase output, other circuit means, including another current-limiting impedance member, for rendering the other said primary winding means responsive to the other phase of the two-phase output, switching means for connecting the source of direct-current voltage to the two-phase output, further circuit means for interconnecting said first secondary winding means of each of the two saturating transformers with said second secondary winding means of the other of the two saturating transformers to obtain two resultant control voltages, and still other circuit means for applying said two resultant control voltages to said switching means to connect the source of direct-current voltage to the two-phase output in a predetermined manner.

References Cited in the file of this patent

UNITED STATES PATENTS

| | | |
|---|---|---|
| 2,698,392 | Herman | Dec. 28, 1954 |
| 2,810,843 | Granqvist | Oct. 22, 1957 |
| 2,820,143 | D'Nelly et al. | Jan. 14, 1958 |
| 2,824,274 | Holt | Feb. 18, 1958 |

OTHER REFERENCES

"High-Speed Counter Uses Surface-Barrier Transistor," Gott, Electronics, March 1956, pp. 174–178.